US012587859B2

(12) United States Patent
Geng et al.

(10) Patent No.: US 12,587,859 B2
(45) Date of Patent: Mar. 24, 2026

(54) SECURE ONBOARD NETWORK COMMUNICATION METHOD, APPARATUS, AND DEVICE

(71) Applicant: Shenzhen Yinwang Intelligent Technologies Co., Ltd., Shenzhen (CN)

(72) Inventors: Feng Geng, Suzhou (CN); Qingdi Sha, Shenzhen (CN); Steven Yin Zhong, Singapore (SG)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 502 days.

(21) Appl. No.: 18/167,627

(22) Filed: Feb. 10, 2023

(65) Prior Publication Data

US 2023/0199500 A1 Jun. 22, 2023

Related U.S. Application Data

(63) Continuation of application No. PCT/CN2020/108772, filed on Aug. 13, 2020.

(51) Int. Cl.
| | |
|---|---|
| *H04W 12/122* | (2021.01) |
| *H04L 9/32* | (2006.01) |
| *H04W 56/00* | (2009.01) |

(52) U.S. Cl.
CPC ............. *H04W 12/122* (2021.01); *H04L 9/32* (2013.01); *H04W 56/002* (2013.01)

(58) Field of Classification Search
CPC ............. H04W 12/122; H04W 56/002; H04W 12/106; H04W 12/61; H04L 9/32;
(Continued)

(56) References Cited

U.S. PATENT DOCUMENTS

| | | | |
|---|---|---|---|
| 10,721,619 | B2 | 7/2020 | Miklos et al. |
| 2010/0217997 | A1 | 8/2010 | Chai et al. |

(Continued)

FOREIGN PATENT DOCUMENTS

| | | |
|---|---|---|
| CN | 101431413 A | 5/2009 |
| CN | 106972926 A | 7/2017 |

(Continued)

OTHER PUBLICATIONS

AUTOSAR, Layered Software Architecture, Document ID 053 : AUTOSAR_EXP_LayeredSoftwareArchitecture, Mar. 21, 2006, 163 pages.

(Continued)

*Primary Examiner* — Christopher M Brandt

(74) *Attorney, Agent, or Firm* — Conley Rose, P.C.

(57) ABSTRACT

A secure onboard network communication method includes obtaining an initial value of a first freshness value (FV), obtaining a second value based on the initial value, and refreshing the initial value to the second value; sending a first message, where the first message includes the second value of the first FV; obtaining an initial value of a second FV, and when a first condition is met, refreshing the second FV to the second value, where the first condition includes a condition that the second value of the first FV is greater than or equal to a sum of the initial value of the second FV and a predetermined value.

20 Claims, 5 Drawing Sheets

(58) Field of Classification Search
CPC ..... H04L 9/002; H04L 9/3242; H04L 9/3297; H04L 2209/84; H04L 63/123; H04L 63/1425; H04L 63/1466; H04L 67/12; H04L 2012/40215; H04L 12/12
See application file for complete search history.

(56) References Cited

U.S. PATENT DOCUMENTS

| | | |
|---|---|---|
| 2016/0044002 A1 | 2/2016 | Ying |
| 2017/0140583 A1* | 5/2017 | Seibert ..................... G06N 5/04 |
| 2018/0089435 A1 | 3/2018 | Zander et al. |
| 2018/0131522 A1 | 5/2018 | Lawlis et al. |
| 2019/0207950 A1* | 7/2019 | Mohammed ........... H04L 63/14 |
| 2019/0228596 A1* | 7/2019 | Mondello ................ G06N 5/04 |
| 2020/0134737 A1 | 4/2020 | Wang et al. |
| 2020/0334980 A1* | 10/2020 | Ludwig .................. H04W 4/44 |

FOREIGN PATENT DOCUMENTS

| | | |
|---|---|---|
| CN | 108075897 A | 5/2018 |
| CN | 109564606 A | 4/2019 |
| CN | 109584063 A | 4/2019 |
| CN | 109729056 A | 5/2019 |
| WO | 2012130888 A1 | 10/2012 |
| WO | 2014169451 A1 | 10/2014 |
| WO | 2018119852 A1 | 7/2018 |
| WO | 2020006052 A1 | 1/2020 |

OTHER PUBLICATIONS

Thomas Rosenstatter et al., Extending AUTOSAR''s Counter-Based Solution for Freshness of Authenticated Messages in Vehicles, IEEE, Dec. 1-3, 2019, 10 pages.
RFC 5869, H. Krawczyk et al., HMAC-based Extract-and-Expand Key Derivation Function (HKDF), Internet Engineering Task Force (IETF) , May 2010, 14 pages.
Wikipedia, ISO 2626, https://en.wikipedia.org/wiki/ISO_26262, 2011, 9 pages.
AUTOSAR, Requirements on Secure Onboard Communication, AUTOSAR CP R22-11, Oct. 31, 2018, 20 pages.
RFC 4493, JH. Song et al., The AES-CMAC Algorithm, Network Working Group, Jun. 2006, 20 pages.
AUTOSAR, Specification of Secure Onboard Communication, AUTOSAR CP Release 4.3.1, Nov. 28, 2019, 150 pages.
Gürgens, s., et al., "A Hardware Based Solution for Freshness of Secure Onboard Communication in Vehicles," Advances in databases and information systems; [Lecture notes in computer science; Lect. notes computer], springer international publishing, cham, pp. 53-68, XP047502231, ISBN: 978-3-319-10403-4, Jan. 31, 2019, 16 pages.

* cited by examiner

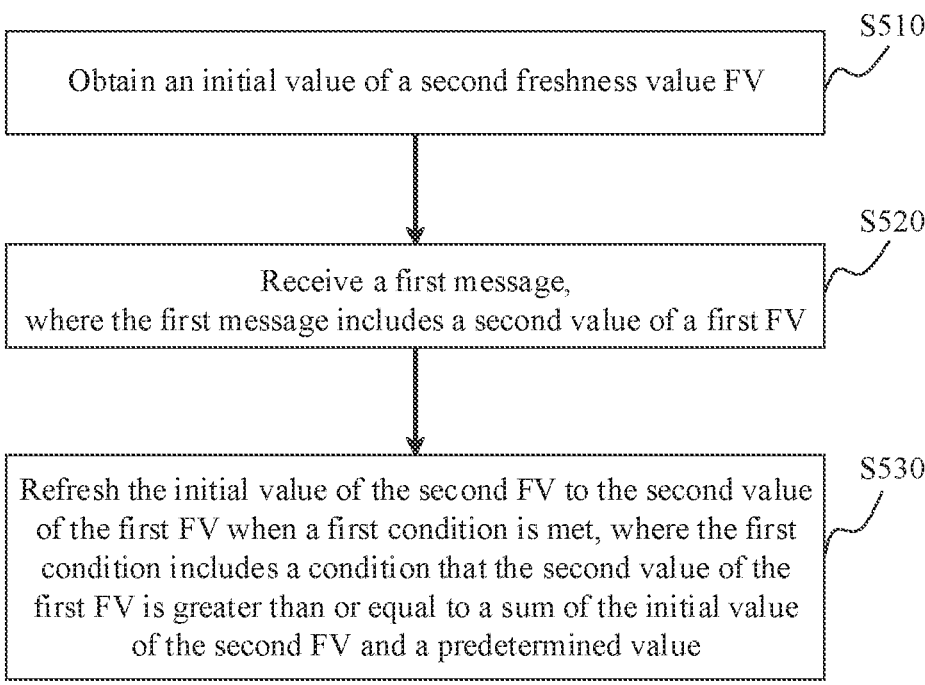

S510

Obtain an initial value of a second freshness value FV

S520

Receive a first message,
where the first message includes a second value of a first FV

S530

Refresh the initial value of the second FV to the second value
of the first FV when a first condition is met, where the first
condition includes a condition that the second value of the
first FV is greater than or equal to a sum of the initial value
of the second FV and a predetermined value

FIG. 5

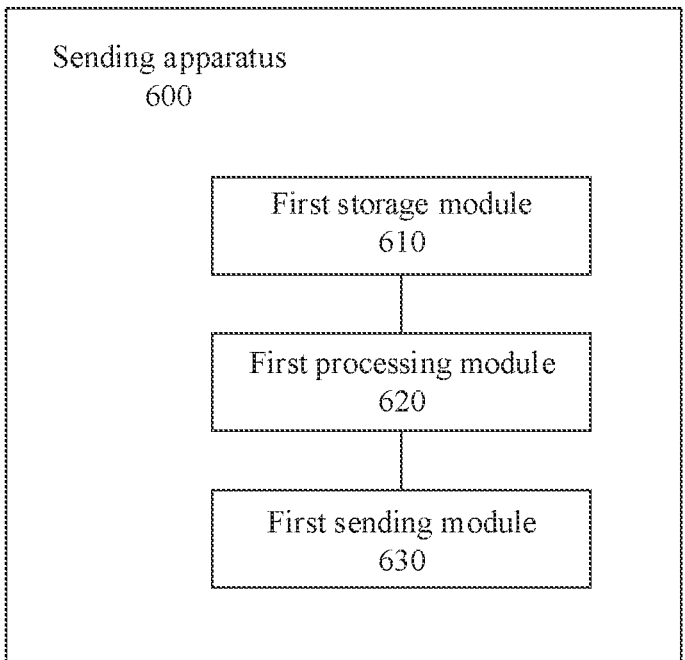

Sending apparatus
600

First storage module
610

First processing module
620

First sending module
630

FIG. 6

SECURE ONBOARD NETWORK COMMUNICATION METHOD, APPARATUS, AND DEVICE

CROSS-REFERENCE TO RELATED APPLICATIONS

This application is a continuation application of International Patent Application No. PCT/CN2020/108772, filed on Aug. 13, 2020, the disclosure of which is hereby incorporated by reference in its entirety.

TECHNICAL FIELD

This application relates to the field of communication technologies, and in particular, to a secure onboard network communication method, an apparatus, and a device.

BACKGROUND

In recent years, automotive technologies are developing rapidly to be increasingly intelligent, electrified, networked, and sharing. A quantity, connections, and interactions of electronic devices inside a vehicle are also increasing. Onboard communication networks are gradually formed, such as Controller Area Network (CAN), Local Interconnection Network (LIN), FlexRay, media oriented systems transport (MOST), and automotive Ethernet. In existing onboard networks, data transmission is performed mostly without security measures or with poor security measures, and is vulnerable to a malicious attack by a hacker.

Because of advantages in timeliness and reliability, a CAN protocol has been widely used in onboard network communication. However, a CAN bus adopts a message-oriented protocol and a broadcast bus network architecture, and direct deployment of a security measure in the conventional technology into the onboard network communication is difficult. Once an attacker accesses the CAN bus, each frame injected by the attacker may be read as a valid frame, and a function of controlling a vehicle is implemented, such as performing acceleration or braking operations. As a result, the vehicle has security risks.

To address the above problems, an AUTomotive Open System ARchitecture (AUTOSAR) organization supplements a Secure Onboard Communication (SecOC) information security component, and introduces a communication encryption and verification standard into a vehicle communication bus, which provides an effective authentication mechanism for an electronic control unit (ECU) message on a message level of a protocol data unit (PDU), to ensure freshness of a PDU message and prevent a message replay attack. An AUTOSAR SecOC specification specifies that a freshness value may use two alternative schemes: timestamp and monotonic counter. A timestamp scheme relies on synchronization of Coordinated Universal Time (UTC) among all ECUs. However, problems such as clock jitter and a timestamp synchronization exception cause a receiver to fail to receive a CAN message, which leads to a system function security problem. For a monotonic counter scheme, implementation of a freshness value synchronization mechanism is complex. There are many unpredictable unstable factors in a freshness value synchronization process, and timely implementation of periodic synchronization cannot be guaranteed, which results in enlargement of a replay attack window.

It can be learned that a simple and effective secure onboard network communication method is urgently needed at present, to ensure that the freshness value is effectively synchronized within a vehicle lifecycle of the vehicle, and to prevent a replay attack.

SUMMARY

This application provides a secure onboard network communication method, an apparatus, and a device, so that in onboard network communication, effective synchronization of a freshness value within a vehicle lifecycle of a vehicle is guaranteed, and a replay attack is prevented. Without relying on an additional freshness value synchronization mechanism, complexity and implementation difficulty of a freshness value synchronization scheme are reduced, and computing resource consumption is reduced.

According to a first aspect, an embodiment of this application provides a secure onboard network communication method, where the method is applied to a sending apparatus and includes obtaining an initial value of a first freshness value (FV); obtaining a second value of the first FV based on the initial value, wherein the second value is greater than the initial value; refreshing the initial value to the second value; and sending a first message, where the first message includes the second value.

According to the technical solution of this application, a FV may be effectively and reliably synchronized within a vehicle lifecycle, thereby reducing a risk of replay attack, and without relying on an additional FV synchronization mechanism, complexity and implementation difficulty of a FV synchronization scheme are reduced, and computing resource consumption is reduced.

With reference to the first aspect, in some possible implementations, the FV may be an N-bit integer, and the N-bit integer ensures that the FV increases monotonically in the vehicle lifecycle. The length N may be determined based on a maximum value of a quantity of sent messages, where the maximum value of the quantity of the sent messages is estimated based on the vehicle lifecycle and a message sending frequency in an onboard communication network of a vehicle. The N-bit integer is determined as a counter based on the maximum value.

With reference to the first aspect, in some possible implementations, a difference between the second value and the initial value is a predetermined value, and the predetermined value is a fixed or a variable positive number.

In this possible implementation, the predetermined value is a positive number, so that it may be ensured that a refreshed first FV monotonically increases. The positive number may be a fixed value or may be a variable value.

With reference to the first aspect, in some possible implementations, the predetermined value is related to the vehicle lifecycle.

In this possible implementation, the predetermined value may be determined based on a vehicle lifecycle length and with reference to a quantity of times that the first FV can be refreshed in the sending apparatus. The predetermined value should not be set excessively large, to avoid quick consumption of the vehicle lifecycle defined by the N-bit integer. The predetermined value should not be set excessively small, to avoid a premature failure of an onboard component due to frequent refreshes.

With reference to the first aspect, in some possible implementations, the initial value of the first FV is 0, a value of a previously refreshed FV, or a value of a reset FV.

In this possible implementation, the value of the reset FV is related to a vehicle status parameter. For example, the vehicle status parameter includes at least one of an accumulated driving mileage or accumulated driving time of the vehicle.

With reference to the first aspect, in some possible implementations, at a moment T2, the second value of the first FV is increased by the predetermined value, or by an amount of information sent between a moment T1 and the moment T2, to obtain a third value, and the second value is refreshed to the third value, where T1 is earlier than T2.

According to a second aspect, an embodiment of this application provides a secure onboard network communication method, where the method is applied to a receiving apparatus and includes obtaining an initial value of a second FV; receiving a first message, where the first message includes a second value of a first FV; when a first condition is met, refreshing the initial value of the second FV to the second value of the first FV, where the first condition includes a condition that the second value of the first FV is greater than or equal to a sum of the initial value of the second FV and a predetermined value.

With reference to the second aspect, in some possible implementations, the predetermined value is a fixed or a variable positive number.

With reference to the second aspect, in some possible implementations, the predetermined value is related to a vehicle lifecycle of a vehicle.

With reference to the second aspect, in some possible implementations, the initial value of the second FV is 0, a value of a previously refreshed FV, or a value of a reset FV.

In this possible implementation, the value of the reset FV is related to a vehicle status parameter. For example, the vehicle status parameter includes at least one of an accumulated driving mileage or accumulated driving time of the vehicle.

According to a third aspect, an embodiment of this application provides an onboard network sending apparatus, where the apparatus includes a first processing module, configured to obtain an initial value of a first FV, obtain a second value of the first FV based on the initial value, and refresh the initial value to the second value; and a first sending module, configured to perform sending of a first message, where the first message includes the second value.

With reference to the third aspect, in some possible implementations, the onboard network sending apparatus may further include a first storage module, and the initial value of the first FV is stored in the first storage module. For example, the first storage module may be a non-volatile memory.

According to a fourth aspect, an embodiment of this application provides an onboard network receiving apparatus, where the apparatus includes a first receiving module, configured to receive a first message, where the first message includes a second value of a first FV; and a second processing module, configured to obtain an initial value of a second FV, and when a first condition is met, refresh the initial value of the second FV to the second value of the first FV, where the first condition includes a condition that the second value of the first FV is greater than or equal to a sum of the initial value of the second FV and a predetermined value.

With reference to the fourth aspect, in some possible implementations, the onboard network receiving apparatus may further include a second storage module, and the initial value of the second FV is stored in the second storage module. In an example, the second storage module may be a non-volatile memory.

With reference to the fourth aspect, in some possible embodiments, the first storage module and the second storage module may be the same or different.

According to a fifth aspect, an embodiment of this application provides an onboard network communication device, where the device includes a first processing module, configured to obtain an initial value of a first FV, obtain a second value based on the initial value, and refresh the initial value to the second value; and a first sending module, configured to send a first message, where the first message includes the second value of the first FV; a first receiving module, configured to receive the first message; a second processing module, configured to obtain an initial value of a second FV, and when a first condition is met, refresh the initial value of the second FV to the second value, where the first condition includes a condition that the second value of the first FV is greater than or equal to a sum of the initial value of the second FV and a predetermined value.

With reference to the fifth aspect, in some possible implementations, the device may further include a storage module, and the initial value of the first FV and the initial value of the second FV are stored in the storage module. In an example, the storage module may be a non-volatile memory.

With reference to the fifth aspect, in some possible implementations, the onboard network communication device may further include at least one of a first storage module or a second storage module, and the initial value of the first FV is stored in the first storage module, and the initial value of the second FV is stored in the second storage module. In an example, the first storage module or the second storage module may be a non-volatile memory.

According to a sixth aspect, an embodiment of this application provides a computer-readable storage medium, where the computer-readable storage medium stores a computer program, and when the computer program is executed, the methods according to the embodiments of the first aspect and the second aspect are implemented.

According to a seventh aspect, an embodiment of this application provides a communication device, including a processor, where the processor is coupled to a memory, the memory stores a computer program, and the processor is configured to execute the computer program stored in the memory, to implement the methods according to the embodiments of the first aspect and the second aspect.

According to the technical solution of this application, a FV may be effectively and reliably synchronized within a vehicle lifecycle, thereby reducing a risk of replay attack, and without relying on an additional FV synchronization mechanism, complexity and implementation difficulty of a FV synchronization scheme are reduced, and computing resource consumption is reduced.

BRIEF DESCRIPTION OF DRAWINGS

FIG. 5 is a schematic flowchart of a secure onboard network communication method in the current technology;

FIG. 6 is a schematic diagram of a structure of an onboard network sending apparatus;

DESCRIPTION OF EMBODIMENTS

This application is further described in detail with reference to accompanying drawings and embodiments. It should be understood that the embodiments described herein are merely used to explain this application but are not intended to limit this application.

The following uses CAN bus communication as an example to describe implementations of this application with reference to the accompanying drawings of the specification.

Figure 1:
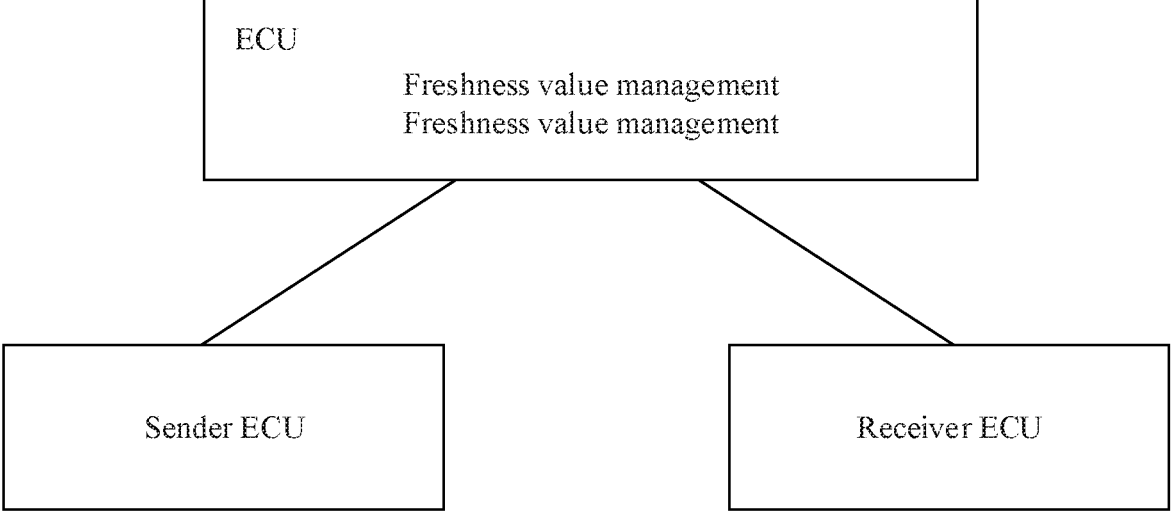
FIG. 1 is a schematic flowchart of an onboard network communication method in the current technology.
Figure 2:
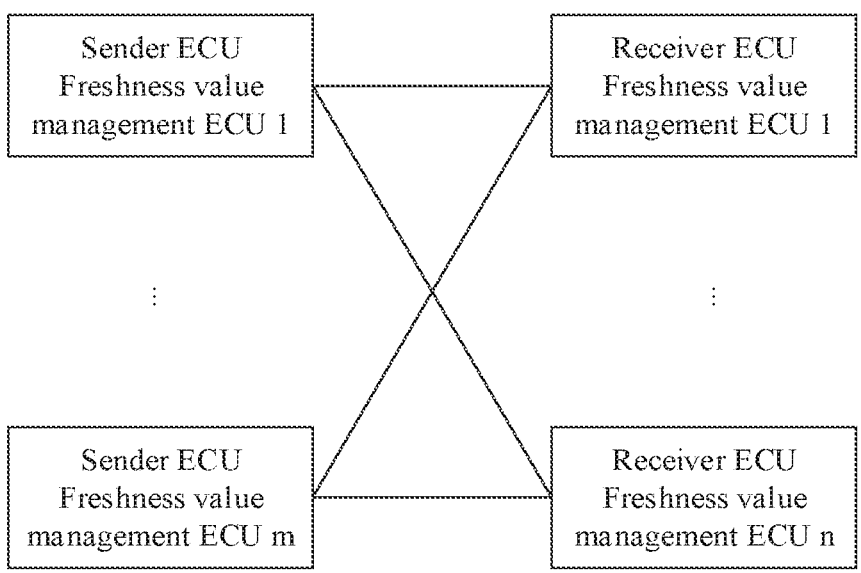
FIG. 2 is a schematic flowchart of another onboard network communication method in the current technology.

FIG. 1 and FIG. 2 are both schematic flowcharts of onboard network communication methods, and are two solutions for FV synchronization in onboard CAN communication. FIG. 1 is a centralized FV management (CVFM) method, and FIG. 2 is a decentralized freshness value management (DFVM) method. For the CFVM and all ECUs share a key. Communication security risks are concentrated on the CFVM. Therefore, a backup mechanism needs to be considered. Persistent power supply needs to be provided for the CFVM, and the CFVM needs to be always online, to ensure smooth FV synchronization. For the DFVM method, although another message is not affected when message synchronization fails, robustness is better than that of the CFVM method, and a security risk are less than that of the CFVM. However, DFVM occupies more controller area network CAN ID resources. More computing resources are occupied by the DFVM as a whole to maintain synchronization of more FVs. For implementation of the FV synchronization in the current technology, for example, during implementation of FV synchronization in AUTOSAR SecOC configuration 3, a design of three synchronization counters and a complex synchronization mechanism makes the implementation of the solution complex, and periodic FV synchronization cannot be ensured. As a result, a replay attack window may be enlarged.

Figure 3:
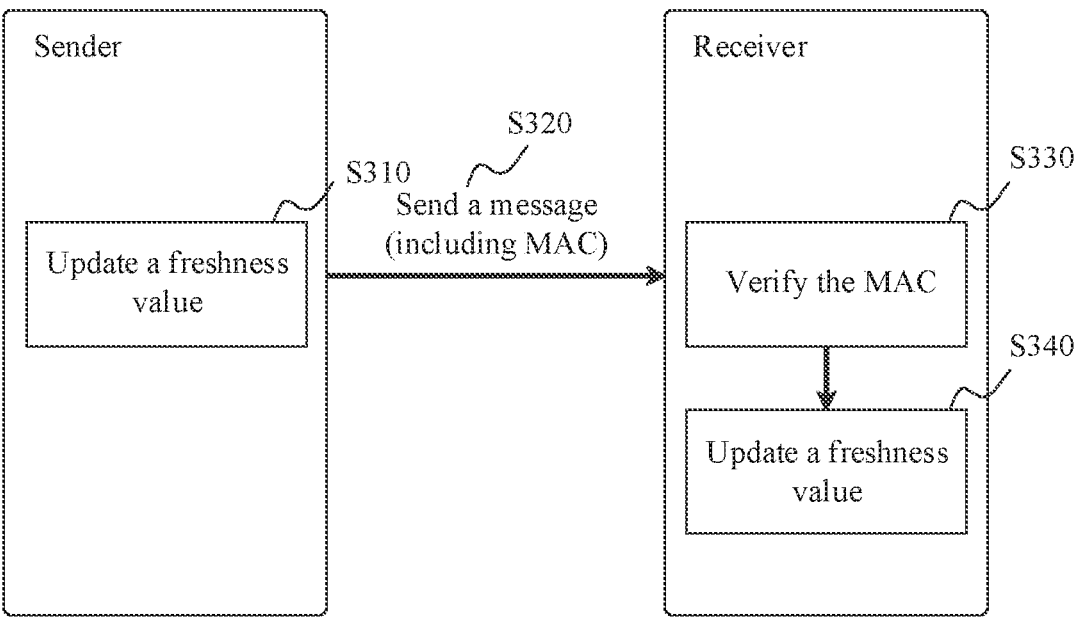
FIG. 3 is a schematic flowchart of still another onboard network communication method in the current technology.

FIG. 3 is a schematic flowchart of another onboard network communication method in the current technology. In an example, the method is a FV synchronization method in an AUTOSAR SecOC solution. Implementation of the solution has an ideal prerequisite, that is, a FV of a sender is required to increase permanently and monotonically. Example steps are as follows.

S310: Before sending a message, the sender updates the FV and a monotonic growth of a counter is ensured.

S320: The sender sends the message to a receiver, where the message includes a message authentication code (MAC).

S330: The receiver performs MAC verification after receiving the message.

S340: After the MAC verification succeeds, the sender updates a FV.

However, in actual technical solution implementation, the FV needs to be copied to a non-volatile memory to achieve permanent maintenance. Therefore, there is a challenge from non-volatile memory reliability.

The FV is increased monotonically, and a write policy needs to be triggered to write the FV to the non-volatile memory during running of a vehicle. For example, the write policy includes 1. write before the vehicle is powered off, or before an ECU sleeps, where the policy is applicable to an always-on device; 2. periodic write, where a write cycle may be determined with reference to a write invalid lifecycle of the non-volatile memory. Due to power-off of the vehicle or uncertainty and unpredictability of the ECU, asynchronization of write cycles of the sender and the receiver may also result in possible FV asynchronization. For example, when an FV value in a non-volatile memory of the sender<an FV value in a non-volatile memory of the receiver, verification information of the receiver may be rejected, and a communication exception occurs. In addition, because the FV is actively maintained by the sender, and updated passively by the receiver, for example, if a component of the sender is repaired or replaced, the FVs of the sender and the receiver are not synchronized.

Figure 4:
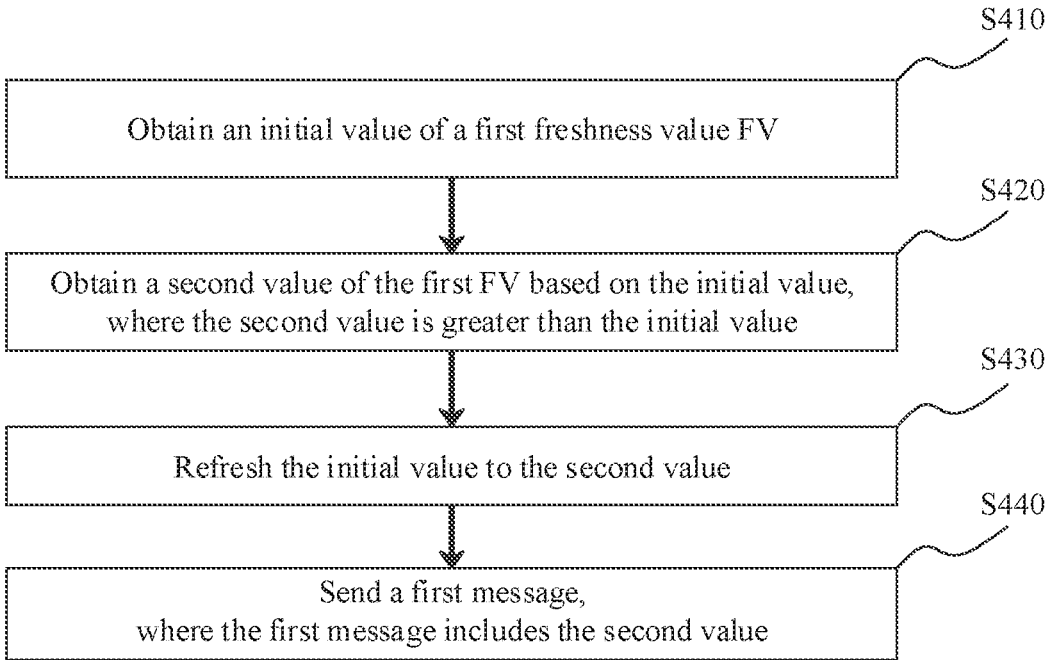
FIG. 4 is a schematic flowchart of a secure onboard network communication method in the current technology.

FIG. 4 is a schematic flowchart of a secure onboard network communication method according to an embodiment of this application. The method is applied to a sending apparatus. The following uses CAN bus communication commonly applied in the onboard communication field as an example for detailed description.

S410: The sending apparatus obtains an initial value of a first FV after being powered on. For example, the initial value may be 0, or may be a value of a previously refreshed FV. When a component of a vehicle is repaired or replaced, the initial value of the first FV may be a value of a reset FV.

A FV may be an N-bit integer, and the N-bit integer ensures that the FV increases monotonically in a vehicle lifecycle. The length N may be determined based on a maximum value of a quantity of sent messages, where the maximum value of the quantity of the sent messages is estimated based on the vehicle lifecycle and a message sending frequency in an onboard communication network of a vehicle. The N-bit integer is implemented by using a counter. When the length N is to be determined, the vehicle lifecycle and a payload constraint of the CAN bus communication should be considered. For example, the foregoing length N may be determined by using the following method.

A total number of messages that may be sent within the vehicle lifecycle $<2^N$, N+24≤CAN message payload, that is:

$$60\times60\times24\times365\times T\times10^3/t<2^N \qquad \text{Formula (1)}$$

In the foregoing formula (1), t is a message sending interval of the CAN communication, in milliseconds (ms), and T is the vehicle lifecycle, in years.

When the CAN message payload is 64 bytes, a maximum value of N is 40.

For example, the message sending interval of the CAN communication is 1 ms. It can be learnt by calculation according to the formula (1) that a maximum vehicle lifecycle is 34.865 years. That is, a FV defined by a 40-bit counter may be guaranteed to increase monotonically in 34.865 years.

As an example, in a scenario in which FVs of a sender and a receiver are not synchronized due to maintenance and replacement of an onboard component, a new diagnosis command may be added to reset FVs of components inside the vehicle. The reset FV should not be used during running of the vehicle. The reset FV may be determined through estimation according to the foregoing method based on an accumulated driving mileage of the vehicle or accumulated driving time of the vehicle.

In an implementation, according to the foregoing conditions: the maximum vehicle lifecycle is 34.865 years, the message sending interval of the CAN communication is 1 millisecond, and the FV is defined by the 40-bit counter. The accumulated driving mileage is taken as an example, and the accumulated driving mileage of the vehicle is assumed to be 50,000 km. The maximum driving time of the vehicle is estimated to be 10,000 hours based on an average walking speed of 5 km/h of an ordinary person (It is assumed that the 50,000 km is a mileage of the vehicle driving at a speed of 5 km/h, but an actual speed of a vehicle is usually much higher than 5 km/h. Such estimation is to ensure that the reset FV increases monotonically as much as possible). A corresponding reset $FV=10000 \times 60 \times 60 \times 10^3$.

In still another implementation, according to the foregoing conditions: the vehicle lifecycle is 34.865 years, the message sending interval of the CAN communication is 1 millisecond, and the FV is defined by the 40-bit counter. The accumulated driving time taken as an example. A difference in milliseconds is obtained based on a date of resetting the FV and a production date of the vehicle. A reset FV is further obtained based on the difference.

S420: Further, a second value of the first FV is obtained based on the obtained initial value of the first FV. For example, a predetermined value may be added to the initial value of the first FV to obtain the second value, where the second value of the first FV is greater than the initial value. The predetermined value is a positive number, so that it can be ensured that the foregoing second value is greater than the initial value. The positive number may be a fixed positive number or a variable positive number.

S430: Further, the initial value of the first FV is refreshed to the second value. For example, when the initial value of the first FV is stored in a first storage module, the foregoing refreshing is implemented by writing the second value of the first FV into the first storage module. After the second value is written into the first storage module, the second value is used as an initial value of the first FV. Optionally, after the second value of the first FV is written into the first storage module, an operation of reading a written FV from the storage module is performed. Optionally, when reading verification fails, an exception alarm is reported.

Further, at a moment T2, the second value (or the foregoing refreshed initial value) is increased by the predetermined value or by an amount of information sent between a moment T1 and the moment T2 to obtain a third value, and the second value (or the foregoing refreshed initial value) is refreshed to the third value. In an example, the moment T1 is a moment at which the second value is obtained, the moment T2 is a moment at which the third value is obtained, and a difference between T2 and T1 may be defined as a refresh cycle. Optionally, based on a running status of the vehicle, a new FV may be obtained by increasing a previous FV by the predetermined value and refreshed according to the foregoing refresh cycle. It may be understood that during a period from T1 to T2, the sender may always be in a power supply state or a normal operating state, that is, no power-off or operating exception occurs, and an initial value of an FV is not refreshed for another reason.

As an example, a refresh cycle value (for example, second, minute, or hour) may be designed based on a rewrite capability supported by hardware. A specific cycle value should be evaluated based on a write invalidate lifecycle of a non-volatile memory of a component purchased by an original equipment manufacturer. A rewrite cycle shall meet a prerequisite that write is valid within the vehicle lifecycle, and rewrite should not be excessively frequent. A non-volatile product is used as an example for an example description. On a prerequisite that storage data is available for a maximum of 10 years, a maximum erasing number of the product is 125,000. It is assumed that the FV is defined by the counter whose length N is 40 bits, and under a condition that the message sending interval in the CAN is 1 ms, at least the maximum vehicle lifecycle of 34.865 years can be covered. A reliable refresh cycle within the vehicle lifecycle may be defined according to formula (2).

$$\text{Refresh cycle}=\min(2^{420}, \text{vehicle lifecycle} \times 24 \times 365 \times 60 \times 60 \times 1000)/n/1000/(60 \times 60) \qquad \text{Formula (2)}$$

In formula (2), n is a maximum erasing number of the non-volatile memory. According to formula (2), under a condition that the maximum erasing number is 125,000, a refresh cycle 2.443 hours can be obtained. It can be learned from formula (2) that a larger maximum erasing number indicates a smaller reliable refresh cycle to be designed. On the other hand, the refresh cycle should not be set excessively small, to avoid quick consumption of the vehicle lifecycle defined by a complete FV. Optionally, the refresh cycle may be set based on statistical average one-off driving time.

S440: Further, the foregoing sending apparatus sends a first message, where the first message includes the second value of the foregoing first FV.

FIG. 5 is a schematic flowchart of a secure onboard network communication method according to an embodiment of this application. The method is applied to a receiving apparatus. The following still uses CAN bus communication as an example for detailed description.

S510: The receiving apparatus obtains an initial value of a second FV after being powered on. For example, the initial value may be 0, or may be a value of a previously refreshed FV. When a component of a vehicle is repaired or replaced, the initial value of the second FV may be a value of a reset FV.

S520: Further, the receiving apparatus receives a first message, where the first message is sent from the foregoing sending apparatus, and the first message includes a second value of a first FV.

S530: Further, the initial value of the second FV is refreshed to the second value of the first FV when a first condition is met. The first condition includes a condition that the second value of the first FV is greater than or equal to a sum of the initial value of the second FV and a predetermined value. For example, when the initial value of the second FV is stored in a second storage module, the foregoing refreshing is implemented by writing the second value of the first FV into the second storage module. After the second value of the first FV is written into the second storage module, the second value is used as the initial value of the second FV. Optionally, after the second value of the first FV is written into the second storage module, an operation of reading a written FV from the storage module is performed. Optionally, when reading verification fails, an exception alarm is reported.

FIG. 6 is a schematic diagram of a structure of an onboard network sending apparatus 600 according to an embodiment of this application. The apparatus is configured to perform the secure onboard network communication method shown in FIG. 4.

The apparatus includes the following modules: a first processing module 620, configured to obtain an initial value of a first FV, obtain a second value of the first FV based on the initial value, and refresh the initial value of the first FV to the second value; and a first sending module 630, configured to send a first message, where the first message includes the second value of the first FV.

In this implementation, the sending apparatus further includes a first storage module 610, and the initial value of the first FV is stored in the first storage module.

It may be understood that for descriptions in this embodiment of this application, refer to descriptions in the foregoing method embodiment corresponding to FIG. 4. Details are not described herein again.

Figure 7:
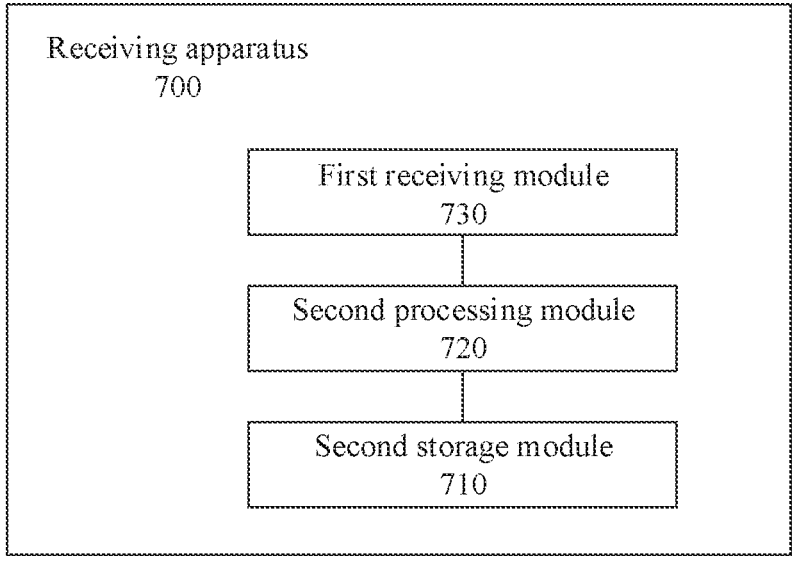
FIG. 7 is a schematic diagram of a structure of an onboard network receiving apparatus.

FIG. 7 is a schematic diagram of a structure of an onboard network receiving apparatus 700 according to an embodiment of this application. The apparatus is configured to perform the secure onboard network communication method shown in FIG. 5.

The apparatus includes a first receiving module 730, configured to receive a first message, where the first message includes a second value of a first FV; and a second processing module 720, configured to obtain an initial value of a second FV, and when a first condition is met, refresh the initial value of the second FV to the second value of the first FV, where the first condition includes a condition that the second value of the first FV is greater than or equal to a sum of the initial value of the second FV and a predetermined value.

In this implementation, the receiving apparatus further includes a second storage module 710, and the initial value of the second FV is stored in the second storage module.

In still another implementation, the first storage module 610 is different from the second storage module 710, and the first storage module 610 and the second storage module 710 are respectively disposed in the sending apparatus 600 and the receiving apparatus 700.

In another implementation, the first storage module 610 is the same as the second storage module 710, that is, a storage module may cooperate with function modules of the sending apparatus 600 and the receiving apparatus 700 at the same time, and separately store the initial value of the first FV and the initial value of the second FV.

It may be understood that for descriptions in this embodiment of this application, refer to descriptions in the foregoing method embodiment corresponding to FIG. 5. Details are not described herein again.

Figure 8:
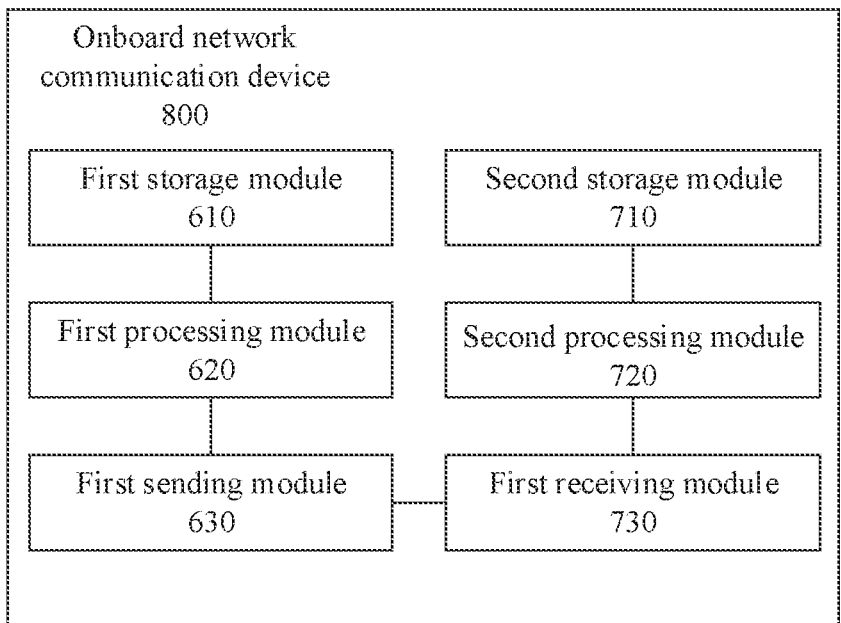
FIG. 8 is a schematic diagram of a structure of an onboard network communication device.

FIG. 8 shows an onboard network communication device 800 according to an embodiment of this application. The communication device performs the secure onboard network communication methods shown in FIG. 4 and FIG. 5. The device includes the following modules: a first processing module 620, configured to obtain an initial value of a first FV, obtain a second value based on the initial value, and refresh the initial value to the second value; a first sending module 630, configured to send a first message, where the first message includes the second value of the first FV; a first receiving module 730, configured to receive the first message; a second processing module 720, configured to obtain an initial value of a second FV, and when a first condition is met, refresh the initial value of the second FV to the second value, where the first condition includes a condition that the second value of the first FV is greater than or equal to a sum of the initial value of the second FV and a predetermined value.

In this implementation, the onboard network communication device may further include a first storage module 610 and a second storage module 710. The initial value of the first FV is stored in the first storage module 610, and the initial value of the second FV is stored in the second storage module 710.

In still another implementation, the first storage module 610 and the second storage module 710 may be a same storage module, and the initial value of the first FV and the initial value of the second FV are separately stored in the storage module.

For the purpose of convenient and brief description, for a detailed working process of the foregoing apparatus and device, refer to a corresponding process in the foregoing method embodiments. Details are not described herein again.

An embodiment of this application provides a computer-readable storage medium. The computer-readable storage medium stores a computer program, and when the computer program is executed, the secure onboard network communication methods provided in the embodiments shown in FIG. 4 and FIG. 5 in this application are implemented.

Figure 9:
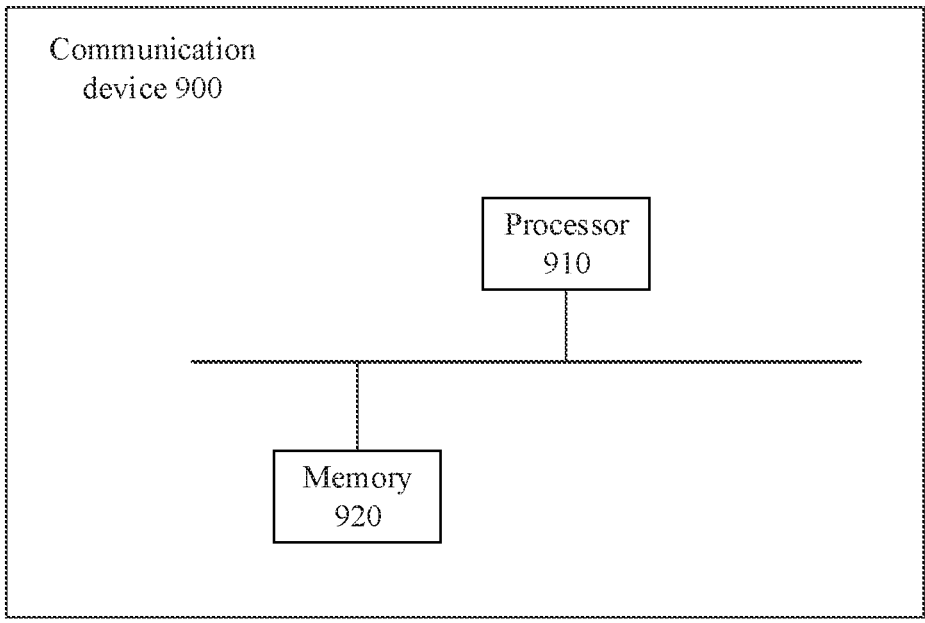
FIG. 9 is a schematic diagram of a structure of a communication device.

FIG. 9 is a schematic diagram of a structure of a communication device 900 according to an embodiment of this application. The device includes a processor 910, configured to execute a computer program stored in a memory 920, to implement the secure onboard network communication methods provided in the embodiments shown in FIG. 4 and FIG. 5 in this application. Optionally, the memory 920 is coupled to the processor 910.

The processor 910 may be one or more processors. This is not limited in this application.

Optionally, the communication device may further include the memory 920. The memory 920 stores the computer program.

It should be noted that the foregoing embodiment is described by using a CAN bus as an example, but constitutes no limitation on this application. The foregoing solution may also be applicable to a technical solution in which another onboard network communication manner is used.

Terms used in the implementations of the embodiments of this application are merely intended to describe embodiments of this application, but not to limit the embodiments of this application.

It should be noted that, for ease of clearly describing the technical solutions in embodiments of this application, words such as "first" and "second" in embodiments of this application are used to distinguish same items or similar items having basically the same functions. For example, the first FV and the second FV are merely used to distinguish different FVs, and unless otherwise explicitly specified and limited, a sequence of the first FV and the second FV is not limited, and cannot be understood as an indication or implication. A person skilled in the art may understand that the terms such as "first" and "second" do not constitute a limitation on a quantity or an execution sequence.

The "automotive" and the "vehicle" in embodiments of this application may be a fossil fuel-powered vehicle, a hybrid electrical vehicle, an electric vehicle, or a fuel cell vehicle. The electric vehicle includes a battery electric vehicle, an extended-range electric vehicle, and the like. This is not limited in this application.

A person skilled in the art can understand that, the functions described with reference to various illustrative logical blocks, modules, and algorithm steps disclosed and described in this specification can be implemented by hardware, software, firmware, or any combination thereof. If the functions are implemented by software, the functions described with reference to the illustrative logical blocks, modules, and steps may be stored in or transmitted over a computer-readable medium as one or more instructions or code and executed by a hardware-based processing unit. A computer-readable medium may include a computer-readable storage medium, which corresponds to a tangible medium such as a data storage medium, or a communication medium including any medium that facilitates transfer of a computer program from one place to another (for example, according to a communication protocol). In this manner, computer-readable medium generally may correspond to (1) a non-transitory tangible computer-readable storage medium or (2) a communication medium such as a signal or carrier wave. The data storage medium may be any usable medium that can be accessed by one or more computers or one or more processors to retrieve instructions, code, and/or data structures for implementing the technologies described in this application. A computer program product may include the computer-readable medium.

In an example but not a limitation, such computer-readable storage medium may include a random-access memory (RAM), a read-only memory (ROM), an electrically erasable programmable ROM (EEPROM), a compact disc ROM (CD-ROM) or another compact disc storage apparatus, a magnetic disk storage apparatus or another magnetic storage apparatus, a flash memory, or any other medium that can be used to store desired program code in a form of instructions or a data structure and that is accessible by a computer. In addition, any connection is properly referred to as a computer-readable medium. For example, if instructions are sent from a web site, a server, or another remote source by using a coaxial cable, an optical cable, a twisted pair, a digital subscriber line (DSL), or a wireless technology such as infrared, radio, and microwave, the coaxial cable, the optical cable, the twisted pair, the DSL, or the wireless technology such as infrared, radio, and microwave is included in a definition of a medium. However, it should be understood that the computer-readable storage medium and the data storage medium include no connection, carrier, signal, or another transitory medium, but are actually directed to a non-transitory tangible storage medium. Disks and discs used in this specification include a compact disc (CD), a laser disc, an optical disc, a digital versatile disc (DVD), and a BLU-RAY disc. The disks usually reproduce data magnetically, whereas the discs reproduce data optically with lasers. Combinations of the above should also be included within the scope of the computer-readable medium.

Instructions may be executed by one or more processors such as one or more digital signal processors (DSPs), a general-purpose microprocessor, an application-specific integrated circuit (ASIC), a field-programmable gate array (FPGA), or an equivalent integrated or discrete logic circuit. Therefore, the term "processor" used in this specification may refer to the foregoing structure, or any other structure suitable for implementing the technologies described in this specification. In addition, the foregoing technologies may be completely implemented in one or more circuits or logic elements.

The technologies in this application may be implemented in various apparatuses or devices, including an onboard device, an integrated circuit (IC), or a set of ICs (for example, a chip set). Various components, modules and units are described in this application to emphasize functional aspects of the apparatuses configured to perform the disclosed technologies, but are not necessarily implemented by different hardware. Actually, as described above, various modules may be combined into hardware in combination with appropriate software and/or firmware, or may be provided by interoperable hardware (including the one or more processors described above).

In the foregoing embodiments, the description of each embodiment has respective focuses. For a part that is not described in detail in an embodiment, refer to related descriptions in other embodiments.

The foregoing descriptions are merely implementations of this application. For a person skilled in the art, any variation or replacement readily figured out within the scope disclosed in this application shall fall within the protection scope of this application. The protection scope of this application shall be subject to the protection scope of the claims.

What is claimed is:

1. A secure onboard network communication method applied to a sending apparatus, wherein the secure onboard network communication method comprises:

refreshing an initial value of a first freshness value (FV) to a second value, wherein the initial value is of a reset FV and is associated with a vehicle status parameter, wherein the vehicle status parameter comprises an accumulated driving mileage of a vehicle or an accumulated driving time of the vehicle, and wherein the second value is based on the initial value and is greater than the initial value; and sending a first message comprising the second value.

2. The secure onboard network communication method of claim 1, further comprising obtaining the initial value.

3. The secure onboard network communication method of claim 1, wherein a difference between the second value and the initial value is a predetermined value.

4. The secure onboard network communication method of claim 3, wherein the predetermined value is associated with a vehicle lifecycle of a vehicle.

5. The secure onboard network communication method of claim 1, further comprising refreshing the second value to a third value, wherein the third value equals the second value plus a predetermined value at a moment T2, and wherein the moment T1 is earlier than the moment T2.

6. The secure onboard network communication method of claim 4, wherein the predetermined value is a fixed positive number or a variable positive number.

7. The secure onboard network communication method of claim 1, further comprising refreshing the second value to a third value, wherein the third value equals the second value plus an amount of information sent between a moment T1 and the moment T2, and wherein the moment T1 is earlier than the moment T2.

8. The secure onboard network communication method of claim 1, further comprising monotonically increasing the first FV for each subsequent message in a lifecycle of the vehicle.

9. A secure onboard network communication method applied to a receiving apparatus, wherein the secure onboard network communication method comprises:

receiving a first message comprising a second value of a first freshness value (FV); and refreshing an initial value of a second FV to the second value when a first condition is met, wherein the initial value is of a reset FV and is associated with a vehicle status parameter, wherein the vehicle status parameter comprises an accumulated driving mileage of a vehicle or an accumulated driving time of the vehicle, and wherein the first condition is that the second value is greater than or equal to a sum of the initial value and a predetermined value.

10. The secure onboard network communication method of claim 9, further comprising obtaining the initial value.

11. The secure onboard network communication method of claim 9, wherein the predetermined value is a fixed positive number or a variable positive number.

12. The secure onboard network communication method of claim 9, wherein the predetermined value is associated with a vehicle lifecycle of a vehicle.

13. An onboard network sending apparatus, comprising:
a memory configured to store instructions; and
one or more processors coupled to the memory and configured to execute the instructions to cause the onboard network sending apparatus to:
refresh an initial value of a first freshness value (FV) to a second value, wherein the initial value is of a reset FV and is associated with a vehicle status parameter, wherein the vehicle status parameter comprises an accumulated driving mileage of a vehicle or an accumulated driving time of the vehicle, and wherein the second value is based on the initial value and is greater than the initial value; and
send a first message comprising the second value.

14. The onboard network sending apparatus of claim 13, wherein the one or more processors are further configured to execute the instructions to cause the onboard network sending apparatus to obtain the initial value.

15. The onboard network sending apparatus of claim 13, wherein a difference between the second value and the initial value is a predetermined value.

16. The onboard network sending apparatus of claim 13, wherein the one or more processors are further configured to execute the instructions to cause the onboard network sending apparatus to refresh the second value to a third value, wherein the third value equals the second value plus a predetermined value at a moment T2, wherein the moment T1 is earlier than the moment T2.

17. The onboard network sending apparatus of claim 13, wherein the one or more processors are further configured to execute the instructions to cause the onboard network sending apparatus to store the initial value in the memory.

18. The onboard network sending apparatus of claim 15, wherein the predetermined value is associated with a vehicle lifecycle of a vehicle.

19. The onboard network sending apparatus of claim 18, wherein the predetermined value is a fixed positive number or a variable positive number.

20. The onboard network sending apparatus of claim 13, wherein the one or more processors are further configured to execute the instructions to cause the onboard network sending apparatus to refresh the second value to a third value, wherein the third value equals the second value plus an amount of information sent between a moment T1 and the moment T2, and wherein the moment T1 is earlier than the moment T2.

\* \* \* \* \*